United States Patent
Gillig

(10) Patent No.: US 7,210,728 B1
(45) Date of Patent: May 1, 2007

(54) VENTED TRANSPORT COVER

(75) Inventor: Jason M. Gillig, Brillion, WI (US)

(73) Assignee: Dowco, Inc., Manitowoc, WI (US)

( * ) Notice: Subject to any disclaimer, the term of this patent is extended or adjusted under 35 U.S.C. 154(b) by 0 days.

(21) Appl. No.: 10/953,177

(22) Filed: Sep. 29, 2004

(51) Int. Cl.
*B60J 11/00* (2006.01)
*E04H 15/14* (2006.01)

(52) U.S. Cl. .............................. 296/136.1; 296/136.07; 150/166; 135/93

(58) Field of Classification Search ................................ 296/136.01–136.13, 95.1; 150/166, 167; 160/370.21; 135/88.01, 88.05, 88.1, 88.13, 135/91, 93; 280/770
See application file for complete search history.

(56) References Cited

U.S. PATENT DOCUMENTS

| | | | |
|---|---|---|---|
| 2,839,986 A | 6/1958 | Herman | |
| 2,939,375 A | 6/1960 | Herman | |
| 3,013,483 A | 12/1961 | Knight | |
| 3,024,717 A | 3/1962 | Rozek | |
| 3,703,432 A * | 11/1972 | Koski | 428/132 |
| 3,892,169 A * | 7/1975 | Jarnot | 454/275 |
| 4,184,414 A | 1/1980 | Jarnot | |
| D266,923 S | 11/1982 | Parks et al. | |
| D271,682 S | 12/1983 | MacDougall | |
| 4,537,119 A | 8/1985 | Jarnot | |
| 4,576,087 A * | 3/1986 | Wolfe | 454/370 |
| 4,898,085 A | 2/1990 | Jarnot | |
| 4,938,522 A | 7/1990 | Herron et al. | |
| 4,976,389 A | 12/1990 | McLellan et al. | |
| 5,081,911 A * | 1/1992 | Talbot | 454/370 |
| 5,289,839 A | 3/1994 | Lombardo | |
| 5,291,698 A * | 3/1994 | Rayner, Jr. | 52/3 |
| 5,328,405 A | 7/1994 | Jarnot | |
| 5,355,703 A | 10/1994 | Elinski et al. | |
| 5,368,055 A | 11/1994 | Johnson et al. | |
| 5,497,819 A * | 3/1996 | Chiang | 150/166 |
| 5,535,559 A * | 7/1996 | Nielsen et al. | 52/199 |
| 5,564,358 A | 10/1996 | Newton | |
| D376,007 S | 11/1996 | Thomas | |
| 5,662,372 A * | 9/1997 | Lubkeman | 296/136.04 |

(Continued)

FOREIGN PATENT DOCUMENTS

CA 2223338 6/1999

(Continued)

*Primary Examiner*—D. Glenn Dayoan
*Assistant Examiner*—Greg Blankenship
(74) *Attorney, Agent, or Firm*—Michael Best & Friedrich LLP

(57) ABSTRACT

A vented transport cover is disclosed for use in protecting vehicles, cargo and other objects during transport. The vented transport cover includes at least one venting member secured within the cover. Each venting member includes a downwardly extending, recessed body portion having an exhaust aperture oriented at the front of the venting member. The venting member includes an upwardly extending air diffuser that disrupts the oncoming stream of air during transport of the object. The air diffuser stabilizes the vent by preventing the vent from flapping during travel. Due to the recessed nature of the exhaust aperture, the air pressure at the exhaust aperture is less than that of the high speed airstream passing over the covered object. Negative pressure at the exhaust aperture induces exhaustion of air from within the cover and causes the cover to conform closely to the surface of the covered object.

27 Claims, 6 Drawing Sheets

U.S. PATENT DOCUMENTS

| | | | |
|---|---|---|---|
| 5,673,961 A | 10/1997 | Mazzarelli | |
| 5,759,098 A | 6/1998 | Jarnot | |
| 5,921,389 A * | 7/1999 | Zoffer | 206/335 |
| 5,997,071 A * | 12/1999 | Mazzarelli | 296/136.07 |
| 6,125,784 A | 10/2000 | Rehel et al. | |
| 6,129,408 A | 10/2000 | Schultz et al. | |
| 6,213,046 B1 | 4/2001 | Lawson | |
| 6,361,249 B1 | 3/2002 | Hodgkinson et al. | |
| D456,339 S | 4/2002 | Buuren | |
| 6,383,959 B1 | 5/2002 | Morris et al. | |
| 6,412,851 B1 | 7/2002 | Burks et al. | |
| 6,439,644 B1 | 8/2002 | Jester | |
| 6,439,991 B1 | 8/2002 | Jarnot | |
| 6,547,313 B2 | 4/2003 | Syron | |
| 6,682,123 B2 | 1/2004 | Burks et al. | |
| 6,712,689 B2 | 3/2004 | Clarkson et al. | |

FOREIGN PATENT DOCUMENTS

| | | |
|---|---|---|
| FR | 2543891 | 10/1984 |
| FR | 2551705 | 12/1986 |

* cited by examiner

VENTED TRANSPORT COVER

BACKGROUND OF THE INVENTION

Field of the Invention

The present invention relates generally to a protective transport covers, and more specifically to vented transport covers for protecting objects such as boats, snowmobiles, campers, motorcycles, all-terrain vehicles, etc. during transport and storage.

Recreational equipment and/or vehicles such as personal watercraft, motorcycles, cars, campers, bicycles, boats and the like are often moved from location to location for maximum enjoyment and use by their owners. However, during transport, these objects are subjected to a variety of environmental conditions such as rain, sunlight, snow, dirt and other debris that can cause irreparable damage to both the exterior and interior of the towed object. In addition, the high winds associated with towing or moving such an object at highway speeds can significantly damage and corrode the object as well as reduce not only the overall useful life of the object but also its value.

To guard against this type of environmental damage, protective covers are employed to shield the vehicle/towed object from such exposed during travel. Several types of covers are available, for example, rigid molded covers that secure the top or completely enclose the object are available, however, these types of covers are not only expensive but heavy, and thus, add unwanted weight and expense to transport of the object. Further, rigid covers are cumbersome and difficult to install on and remove from a vehicle.

Flexible covers, such as plastic or canvas, are also employed for protection of vehicles during transport. Flexible covers can be lightweight, easy to install and an attractive means for protecting a vehicle during transport. However, at highway speeds, conventional flexible covers tend to blow off the vehicle/towed object and must be tightly secured to the vehicle or the trailer in order for the vehicle to remain covered.

In addition, during travel at high speeds, conventional flexible covers tend to whip or flap as a result of the differences between the air pressure inside the cover and the relatively higher pressures outside the covers. This whipping and flapping can cause the cover to tear, which can not only damage the covered object, but also can expose it to the very environmental conditions the cover was designed shield. In addition, the whipping and flapping of a flexible cover during transport is extremely noisy, which can unsafely disrupt not only the passengers in the towing vehicle but other drivers on the road.

It is accordingly the primary objective of the present invention to provide a vented transport cover that can be secured to a vehicle or other object for transport at high speeds and/or in a high pressure airstream without coming loose or ballooning up during travel. It is therefore a related object of the present invention to provide a vented transport cover that does not whip or flap when exposed to high pressure airstreams during travel, but instead, conforms closely to the vehicle or object being transported.

It is a further object of the present invention to provide a vented transport cover for use with a wide variety and size of vehicles such as personal watercraft, pontoon boats, speed boats, motorcycles, snowmobiles, all-terrain vehicles etc., as well as a wide variety of items such as canoes, campers, bicycles or any other trailered cargo.

It is yet another object of the present invention to provide a vented transport cover that is easy to install onto and remove from an object. It is a related object of the present invention to provide a vented transport cover that is easily stored when not in use.

It is a further object of the present invention to provide a venting system for use in protective transport covers that reduces not only whipping and flapping of the protective cover during transport of the object, but also the noise associated with such whipping. It is, thus, a related object of the present invention to provide a venting system including at least one venting component that utilizes the oncoming airstream to create negative pressure at the exhaust opening to exhaust air from within the cover.

It can be another object of the present invention to provide a covered object protected from exposure to high pressure airstreams experienced during transport utilizing the vented transport cover of the present invention. It can be a related object of the present invention to provide a method for transporting an object in a high pressure airstream using the vented transport cover of the present invention.

The vented transport cover of the present invention must also be of construction which is both durable and long lasting, and it should also require little or no maintenance to be provided by the user throughout its operating lifetime. In order to enhance the market appeal of the vented transport cover of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, a vented transport cover is provided for the protection of cargo, such as personal watercraft, boats, motorcycles, cars, campers, and the like, over a wide range of vehicle speeds. The vented transport cover is provided with a venting system that substantially eliminates whipping and flapping of the cover at such vehicle speeds, thereby reducing the noise and potential environmental damage commonly exhibited with use of conventional transport covers.

The cover includes a front side oriented toward the direction of travel, a rear side that faces away from the direction of travel, opposing sides, a top, and a bottom. The cover fits over the object and the bottom of the cover is fitted to and tightly secured around the perimeter of the object to minimize airflow underneath the cover.

The vented transport cover of the present invention includes at least one venting member positioned within the cover. The vented transport cover may include venting members placed in any location in the cover that experiences airflow thereover. This includes the front side, the rear side, the top, and the bottom of the cover. The venting member includes a base portion, a body portion and an air diffusing member. The base portion is secured to the cover by sewing or otherwise affixing the venting member to the cover.

The body portion of the venting member extends inwardly from the base portion and is recessed inside the cover. The body portion includes an open front end, also recessed below the surface of the cover, from which air is exhausted from within the cover during transport. The body portion ramps upward from the open front end to the rear of the venting member, providing a flat, rear-facing end that transitions into the base portion and is therefore flush with the cover.

The vented transport cover also includes an air diffusing member that extends slightly above the exterior surface of the cover and is slightly arced toward the front of the cover. The air diffusing member is configured to extend into the stream of oncoming air thereby disrupting/deflecting the airstream as it flows over the venting member. Accordingly, as the airstream encounters the air diffusing member, the air diffusing member induces a downward pressure on the venting member, forcing the venting member and cover downwardly towards the exterior surface of the underlying object, and thereby stabilizing the venting member within the airstream.

In addition, as the covered object travels in the airstream, the air pressure within the cover is less than the high pressure airstream flowing over the exterior of the covered object. The pressure drop at the exhaust aperture of the venting member (compared to the relatively high pressure of the oncoming airstream) results in the exhaust of air from inside the cover. Accordingly, the negative pressure inside the cover causes the cover to conform tightly to the exterior surface of the object, inhibiting whipping and buffeting of the cover.

It may therefore be seen that the present invention teaches a vented transport cover that can be used to transport objects at high speeds without coming loose or ballooning up during travel. By utilizing the high-pressure airflow over the venting member in conjunction with an air diffusing flap for disrupting such airflow, the vented transport cover of the present invention does not whip or flap when exposed to high pressure airstreams during travel, but instead, conforms closely to the vehicle or object being transported.

The vented transport cover of the present invention is of a construction which is both durable and long lasting, and which will require little or no maintenance to be provided by the user throughout its operating lifetime. The apparatus of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Figure 1:
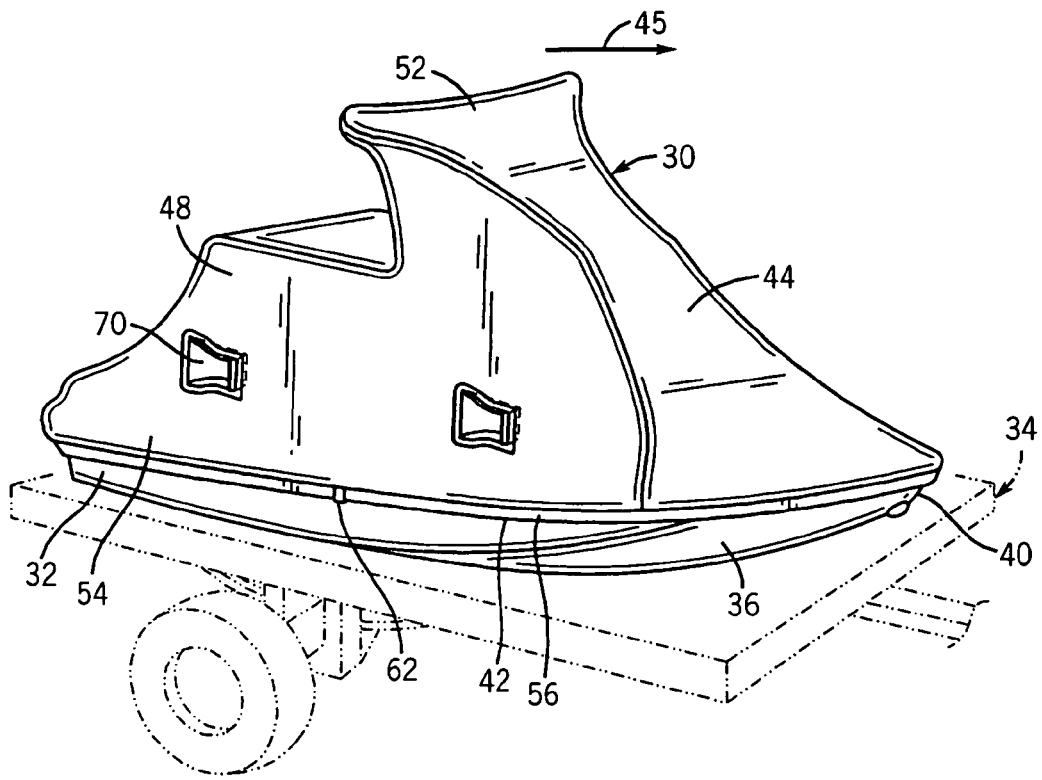
FIG. 1 is a front perspective view of a vented transport cover of the present invention, shown installed onto a personal watercraft.

FIG. 1 illustrates a vented transport cover, indicated generally at 30, of the present invention secured to a personal watercraft 32 being transported by a trailer 34 (trailer shown in phantom for illustrative purposes only). While described herein for use with a personal watercraft, the vented transport cover of the present invention may be designed fit a variety of different and/or specialized vehicles, crafts or objects in a wide array of sizes and shapes.

Figure 2:
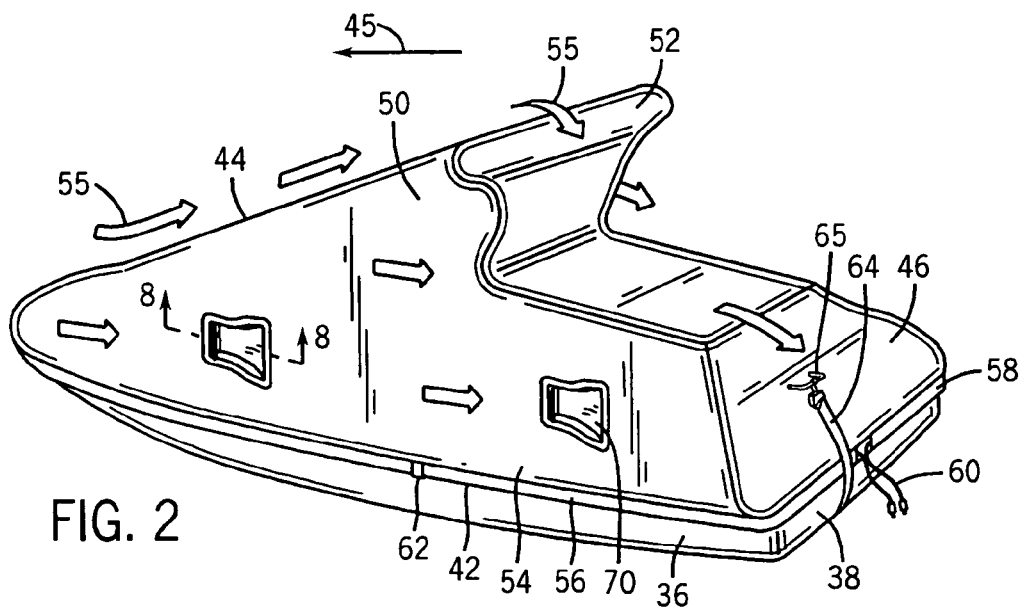
FIG. 2 is a rear perspective view of the vented transport cover illustrated in FIG. 1, with air directional arrows provided.

As best illustrated in FIGS. 1 and 2, the vented transport cover 30 is configured to closely fit the exterior contours of the watercraft 32. The watercraft has a hull 36, a stern 38 and a bow 40. The hull 36 is formed generally with a gunnel portion 42 on each side of the watercraft.

The cover 30 includes a front end, indicated generally at 44, oriented toward the direction of travel (as indicated by the directional arrow 45 shown in FIG. 1), a rear end, indicated generally at 46, facing away from the direction of travel and opposing side portions indicated generally at 48 and 50. The cover 30 further includes a top portion, indicated generally at 52, and a bottom portion, indicated generally at 54. As best illustrated in FIG. 2, as the watercraft 32 is transported on the trailer 34, air 55 flows over the cover 30 opposite the direction of travel from the front end 44 to the rear end 46.

The cover 30 fits over the top of the watercraft 32 and extends downward over the sides/gunnel portions 42 of the watercraft 32 from the bow 40 (the front) to the stern 38 (the back) of the watercraft 32. The bottom portion 54 of the cover 30 is open in order to accommodate the watercraft 32 therein. An edge 56 of the bottom portion 54 of the cover 30 is fitted to and tightly secured around the perimeter of the hull 36 to minimize airflow underneath the cover 30.

Preferably, the edge 56 of the cover 30 includes a folded seam 58 with elasticized drawstrings or bungee cords 60 inserted therethrough so that the cover can be tightly cinched and clasped around the hull 36 of the watercraft. Alternatively, the edge 56 of the cover may be secured around the hull using an elasticized band. As will be apparent to those skilled in the art, the edge 56 may be secured around the hull 36 using any fastening means known to those skilled in the art for tightly securing the cover fabric around the object.

For added security, each of the side portions 48 and 50 of the cover 30 may optionally include a J-channel clip 62 attached to the bottom portion near the edge thereof. The J-channel clips 62 may then be used to hook onto the gunnel portion 42 on each side of the watercraft 32, ensuring the cover remains tautly drawn over the watercraft 32. The J-channel clips 62 are preferably sewn to the cover, however, the clips may be attached to the cover by any means known to those skilled in the art.

In addition, the cover 30 may optionally include tie down loops or securing straps 64 attached around the perimeter of the cover 30 for positive securing to the hull 36 of the watercraft 32. The tie down loops/securing straps 64 may include a hook 65 on each end thereof to attach the strap 64 to the cover 30 and the watercraft 32. The tie down loops/ securing straps 64 may also include clips, hooks, buckles, ropes, bungee cords or any fastening/securing means known to those skilled in the art for tightly securing the straps 64 and the cover 30 to the watercraft 32. Alternatively, the tie down loops/securing straps 64 may attach to the trailer, rather than the watercraft 32, provided the attachment minimizes the amount of air flowing inside the cover 30.

Without limitation, the cover 30 may be constructed of any flexible, woven or nonwoven covering material. Such materials include, but are not limited to, canvas, cotton, vinyl, nylon, high-density polyethylene, acrylic and/or combinations thereof. More preferably, however, the cover material is constructed of any air impermeable material known to those skilled in the art, such as polyester or polypropylene. Most preferably, the cover 30 is constructed of polyester material.

The cover material can also include a water resistant coating such as polyurethane, polyvinyl chloride (PVC) or any plastic or rubber-based water resistant coating. Preferably, however, the cover 30 material contains a polyurethane resin coating.

Additionally, the cover material may be treated with any durable water repellent (DWR) known to those skilled in the art. Likewise, the cover material may be treated for mildew, heat and/or ultraviolet resistance.

As illustrated in FIGS. 3 through 8, in addition to FIGS. 1 and 2, venting members 70 are positioned within openings 72 formed in each of the side portions 48 and 50 of the cover 30. While the venting members 70 are preferably located within the side portions 48 and 50 of the cover 30, the venting members 70 can be positioned at any location on the cover 30 in which an associated airstream will flow over the venting member during transport. Accordingly, venting members 70 may be positioned, for example, on the front end 44, the rear end 46, the top portion 52, or the bottom portion 54 of the cover 30.

In a personal watercraft application, as illustrated in FIGS. 1 through 8, the cover 30 preferably includes two venting members 70 on each side portion 48 and 50 of the cover 30. However, it will at once be appreciated by those skilled in the art that the cover 30 may include only one venting member 70 or a plurality of venting members 70 in any location on the cover as previously described. The number of venting members 70 provided within the cover 30 can depend on a variety of design considerations such as the size and type of object being transported, the transport conditions, the materials of construction of the venting member, the materials of construction of the cover and/or the size of the venting member.

Each venting member 70 has a front end, indicated generally at 74, oriented in the direction of travel and a rear end, indicated generally at 76, facing away from the direction of travel. The venting member contains a base portion 78 in the form of an outwardly extending flange, a body portion 80 which extends downwardly from the base portion 76 and an air diffusing member 82 which extends upwardly from the base portion 76.

Figure 3:
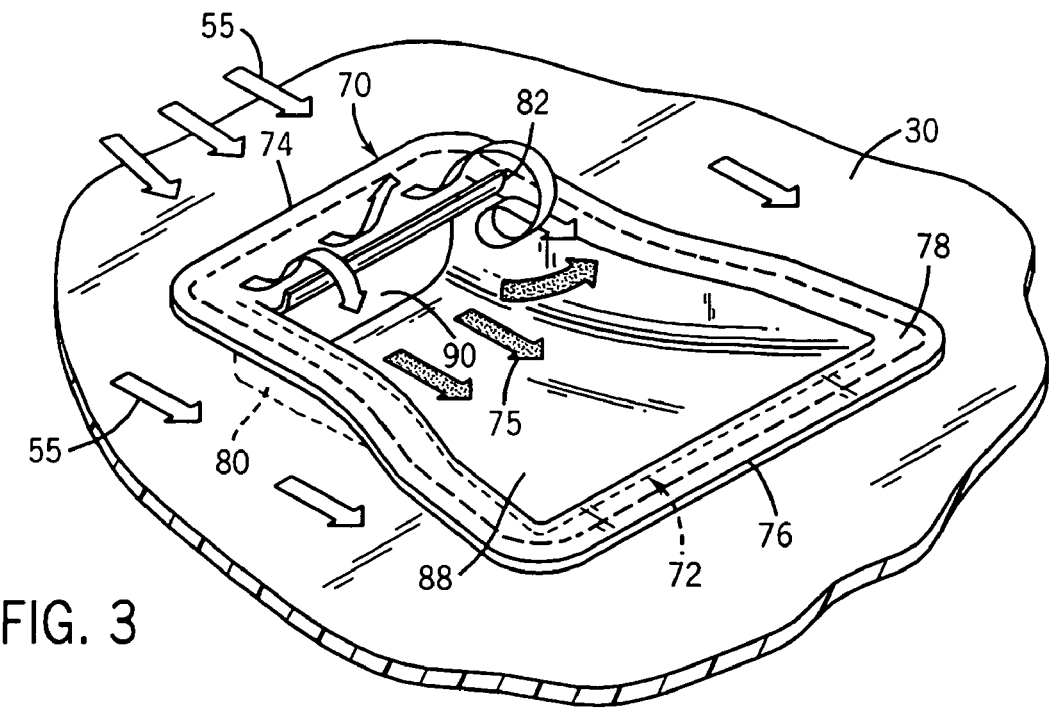
FIG. 3 is a fragmentary view of the cover containing a venting member as illustrated in FIGS. 1 and 2.
Figure 4:
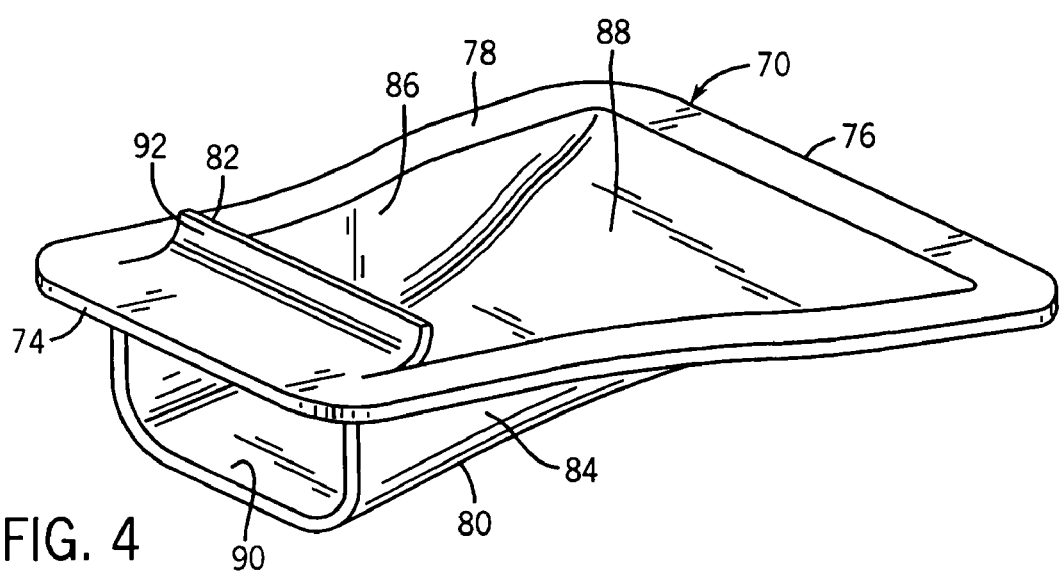
FIG. 4 is a front perspective view of a venting member, consistent with the teachings of the present invention.
Figure 5:
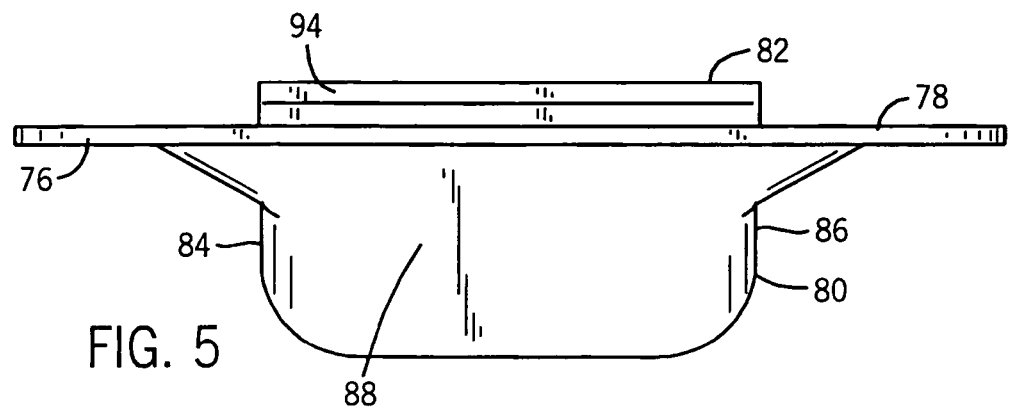
FIG. 5 is a rear elevational view of the venting member illustrated in FIG. 4.
Figure 6:
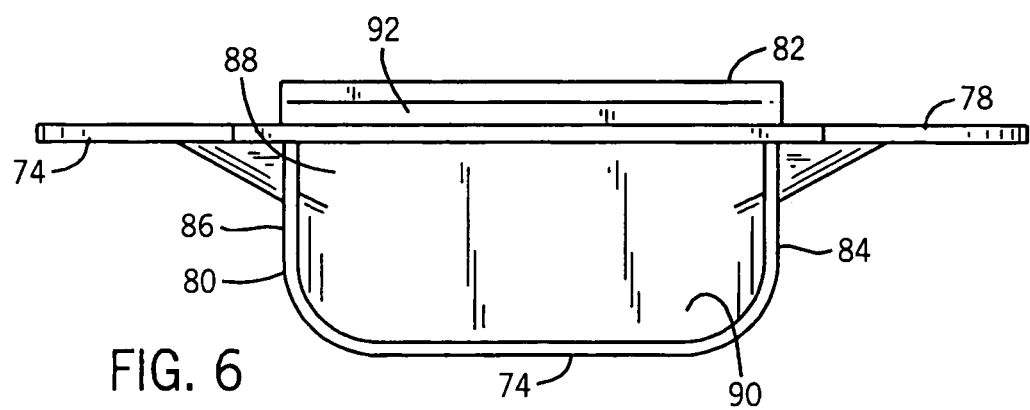
FIG. 6 is a front elevational view of the venting member illustrated in FIGS. 4 and 5.
Figure 7:
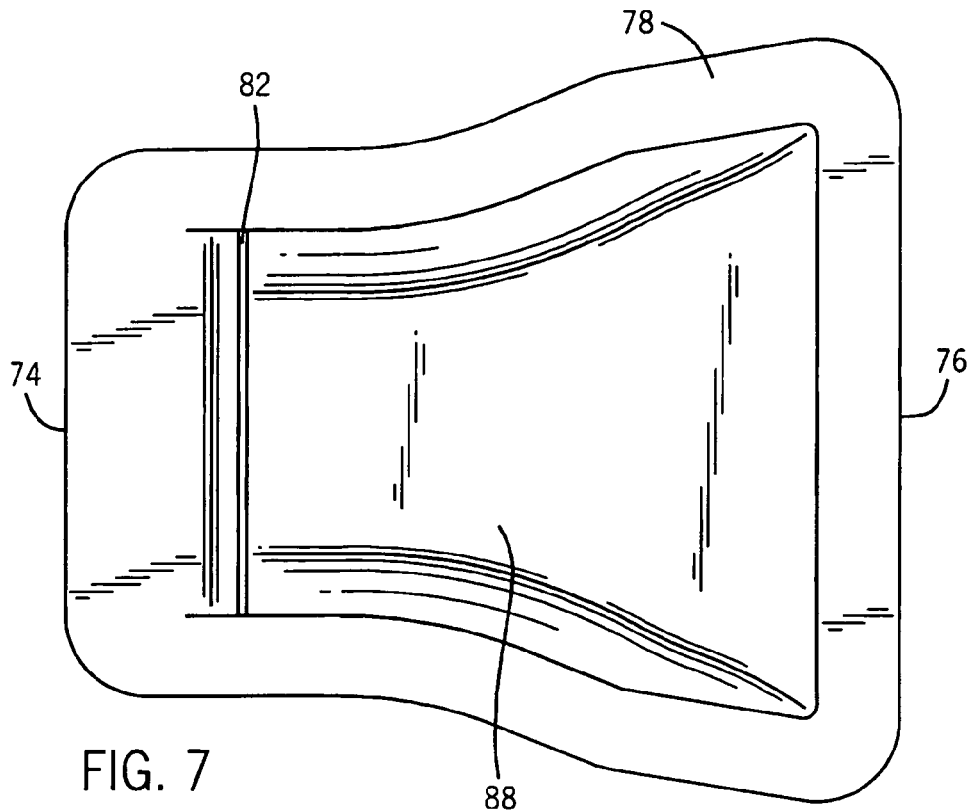
FIG. 7 is a top plan view of the venting member illustrated in FIGS. 4 through 6.
Figure 8:
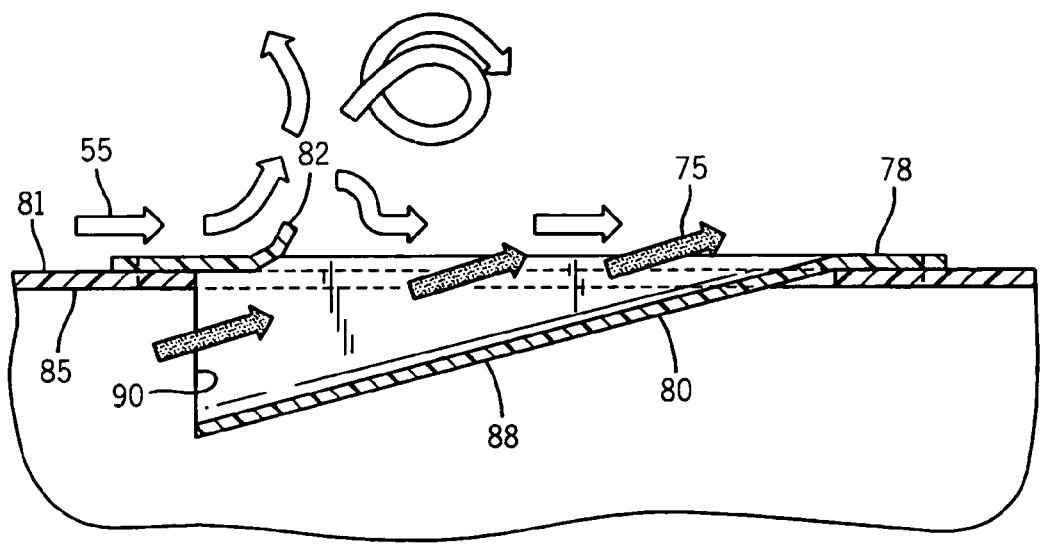
FIG. 8 is a sectional view of a portion of the cover illustrated in FIGS. 1 through 3, showing the venting member depicted in FIGS. 4 through 6.

As best illustrated in FIGS. 3 and 8, each venting member 70 is attached to the cover 30 such that the bottom surface of the base portion 78 lies flat against and is flush with the exterior surface 81 of the cover 30—with the body portion 80 extending downward inside the cover 30. Each venting member 70 is secured to the cover 30 by stitching 83 the base portion 78 to the cover 30 around the perimeter of each associated opening 70 in the cover 30. However, the venting members 70 can be attached to the cover 30 using rivets, staples, snaps or any fastening means known to those skilled in the art. In addition, the venting members 70 may be heat sealed, adhered or otherwise chemically bonded to the cover 30 using any securing means known to those skilled in the art.

It will also be apparent to those skilled in the art that the venting member 70 may be secured to the cover 30 such that the top surface of the base portion 78 lies flat against and is flush with the interior surface 85 of the cover 30. In this configuration, the venting member 70 may be attached to the cover 30 using any of the attaching means discussed herein.

The body portion 80 of the venting member 70 extends inwardly with respect to the surface of the cover 30 and is recessed therewithin. The body portion 80 has opposing tapering sides 84 and 86 and an upwardly-inclined bottom portion 88. At the front end 74 of the venting member 70, the sides 84 and 86 together with the bottom portion 88 define an exhaust aperture 90 in the body portion 80.

As best illustrated in the FIGS. 4 through 6 and 8, the body portion 80 ramps upwardly from the front end 74 to the rear end 76 of the venting member 70, with each of the sides 84 and 86 tapering upwardly accordingly, such that the bottom portion 88 joins the base portion 78 and is substantially flush with the surface of the cover 30 at the rear end 76 of the venting member 70.

The air diffusing member 82 of the venting member 70 extends upwardly from the base portion 78 and has a front-facing surface 92, oriented toward the direction of travel, and a rear-facing surface 94 oriented away from the direction of travel. The air diffusing member 82 is slightly arced towards the front end 44 of the cover 30.

As the watercraft 32 is being transported, a stream of air passes over the cover 30 and the venting member 70 (illustrated by the arrows in FIGS. 2, 3 and 8). The oncoming, high-pressure airstream is disrupted/deflected by the upwardly extending air diffusing member 82. Accordingly, the pressure of the airstream against the front-facing surface 92 of the air diffusing member 82 forces the vent downwardly towards the watercraft 32—preventing the vent and the cover 30 from flapping around during travel, thereby stabilizing the venting member 70 and the cover 30 within the airstream.

During transport, high pressure air flows along side the covered watercraft 32 and over the venting member 70. By locating the exhaust aperture 90 in a recessed configuration within the cover 30, a pressure differential exists between the oncoming airstream flowing over the cover 30 and the venting member 70 and the area of the venting member 70 at the exhaust aperture 90. Thus, the pressure within the cover 30 is less than that of the oncoming airstream 55. Accordingly, negative pressure at the exhaust aperture 90 causes air 75 to be exhausted from within the cover 30, as indicated by shaded arrows 75 in FIGS. 3 and 8. Such a suction effect causes the cover 30 to tightly conform to the exterior surfaces of the watercraft 32, significantly inhibiting whipping and flapping of the cover 30.

Further, and without limitation to any particular theory or mode of operation, the air diffusing member 82 sufficiently disrupts the oncoming high pressure airstream such that turbulent air in the form of eddy currents flows over the venting member 70. This turbulent air passes over the exhaust aperture 90 in the venting member 70, at least partially enhancing the suction effect at the exhaust aperture 90 in the front end 74 of the venting member 70.

Accordingly, the vented transport cover 30 of the present invention inhibits whipping and flapping over a wide range of transport vehicle speeds. As the speed of the airflow increases with vehicle speed, so does the effect of the airflow across the venting member 70, thereby resulting in a corresponding increase in the pressure differential at the exhaust aperture 90 of the venting member 70—causing air to be exhausted from the cover 30 and causing the cover 30 to conform more closely to the exterior surface of the watercraft 32.

While the air diffusing member 82 is illustrated in a longitudinal position slightly closer to the rear end 76 of the venting member 70 than the exhaust aperture 90, it will be appreciated by those skilled in the art that the air diffusing member may be located in any longitudinal position along the venting member 70 (from its front end 74 to its rear end 76) capable of causing the venting member to stabilize within the airstream. It will also be appreciated by those skilled in the art that the air diffusing member 82 may be disposed at an angle with respect to the exhaust aperture 90 and/or the longitudinal axis of the venting member 70. For example, the air diffusing member 82 may be tipped/rotated upwardly or downwardly at any angle capable of causing the venting member to stabilize within the airstream.

Likewise, the venting member 70 may contain an air diffusing member 82 of any shape or size, that sufficiently causes the venting member 70 to stabilize within the airstream. For example, the air diffusing member 82 may consist of multiple flaps or tubular segments extending upwardly from the base portion 78 into the stream of oncoming air. In addition, the air diffusing member 82 may contain decorative indicia, markings or cut-outs therein, provided the air diffusing member 82 sufficiently disrupts the airstream over the venting member 70, as described herein.

Figure 9:
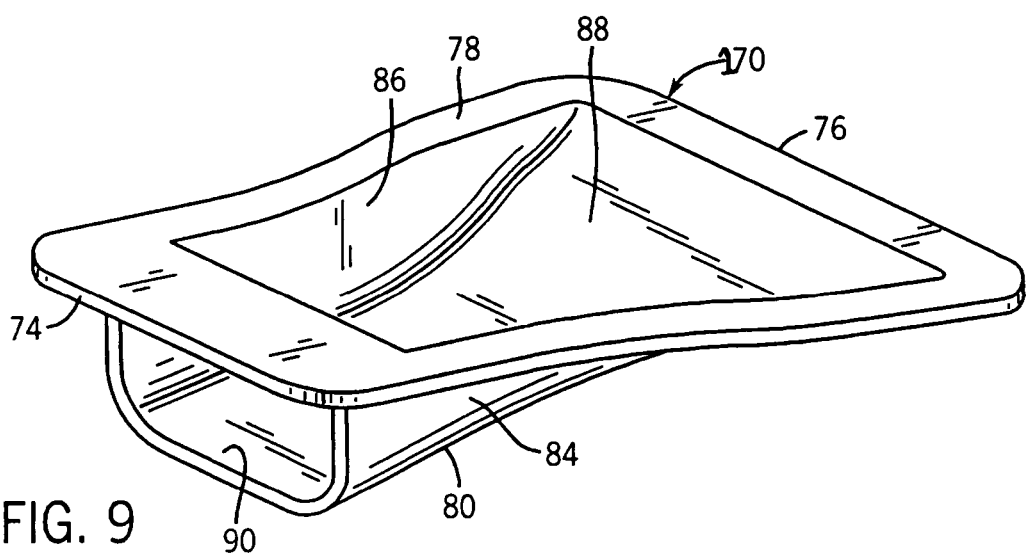
FIG. 9 is a front perspective view of an alternate embodiment of the venting member, consistent with the teachings of the present invention.

Consistent with the broader aspects of the present invention, a venting member 170 may be provided without an air diffusing member, as illustrated in FIG. 9. In such applications, the venting member 170 will be configured as described herein and, therefore, includes a front end 74, a rear end 76, a base portion 78, and a body portion 80 which will extend inwardly with respect to the surface of the cover 30 and is recessed therein. The sides 84 and 86 of the venting member 170 together with the bottom portion 88 define an exhaust aperture 90 in the body portion 80.

As will be further appreciated by those skilled in the art, the venting member 70 may be constructed in a variety of shapes and sizes, depending on the size and shape of the covered object, as well as the particular application of use. Thus, consistent with the broader aspects of the present invention, the venting member 70 may contain a body portion 80 of any size and or shape that permits air to exhaust from the cover and that can be recessed within the cover 30.

Figure 10:
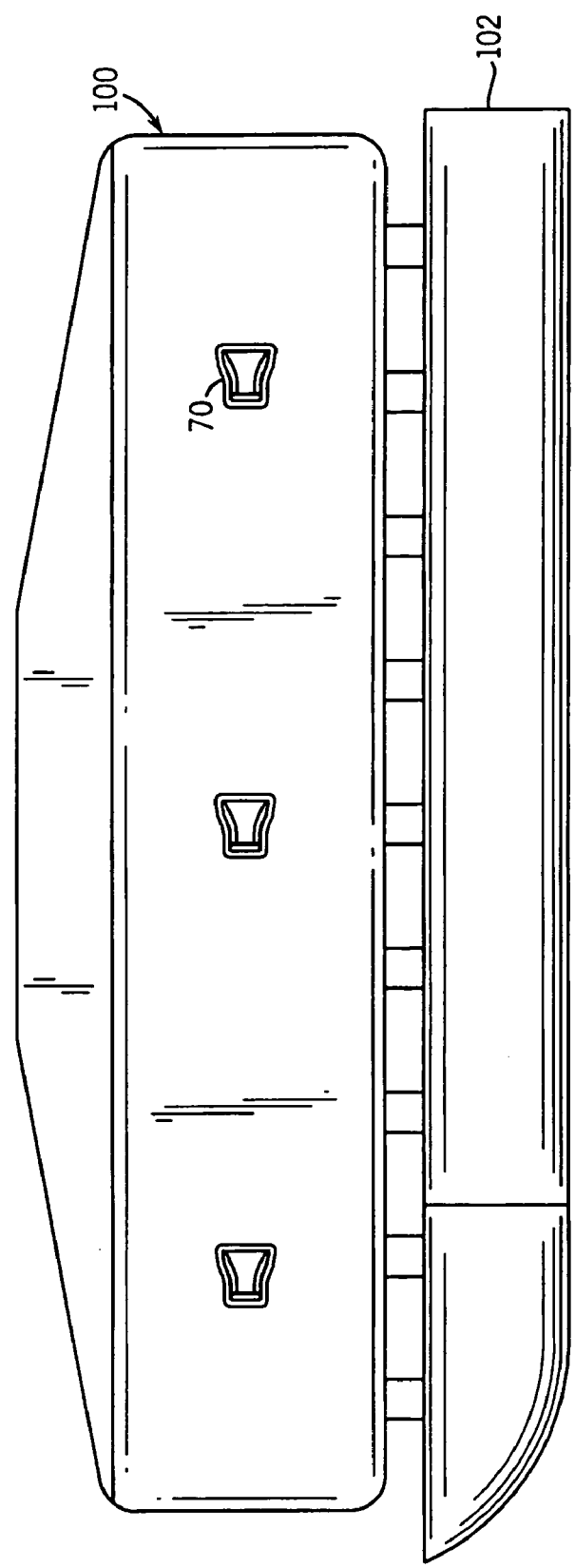
FIG. 10 is side view of an alternate embodiment of the vented transport cover of the present invention installed on a pontoon boat.

As illustrated in FIGS. 1, 2 and 10, the front end 74 and the rear end 76 of the venting member 70 are positioned within the cover 30 such each is substantially parallel with the longitudinal axis of the cover 30. Thus, the longitudinal axis of the venting member 70 is substantially parallel with that of the cover 30.

However, consistent with the broader aspects of the present invention, the venting member 70 may be tipped, rotated and/or angled with respect to the longitudinal axis of the cover 30, and/or angled with respect to the direction of the oncoming airstream (e.g. the front end 74 of the venting member is angled upwardly or downwardly with respect to the longitudinal axis of the cover 30 or angled with respect to the direction of the oncoming airstream). Preferably, the venting member is oriented to create sufficient vent slope to encourage water run-off and drainage to prevent water and rain from directly entering the vent.

Preferably, the venting member 70 is constructed of polyurethane. However, the venting member 70 may be constructed of any material capable of withstanding the environmental conditions (e.g. temperature and/or ultraviolet exposure) typically experienced by the covered cargo during transport. Thus, the venting member may be constructed of any plastic, thermoplastic, rubber, wood, metal and/or composite material known to those skilled in the art.

Turning next to FIG. 10, an alternate embodiment of the present invention is illustrated. A vented transport cover 100 is shown for protecting a pontoon boat 102 during travel at high speeds. The vented transport cover 100 includes venting members 70, similar to those described herein, for disrupting the air flowing over the vent and causing air to exhaust from underneath the cover. As such, the vented transport cover of the present invention can substantially eliminate whipping and flapping of a protective cover by causing the cover to conform closely to the exterior surface of the covered object.

It may therefore be seen that the vented transport cover of the present invention can be used in wide range of applications including use in the transport or trailering of boats, snowmobiles, motorcycles, all-terrain vehicles, cars, campers, canoes, bicycles and other cargo typically transported at freeway speeds.

Although an exemplary embodiment of the vented transport cover of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A vented transport cover for protecting cargo during transport, said cover comprising:
   a cover member having a front portion oriented in a direction of travel and a rear portion oriented opposite the direction of travel, said cover member configured to fit over the cargo and including an opening formed in a surface thereof; and
   a venting member secured to said cover member within said opening, said venting member including:
   an exhaust aperture extending inwardly relative to said surface of said cover member and oriented towards said front portion of said cover member; and
   an air diffusing member extending outwardly relative to said surface of said cover member;
   a flow path being defined through the venting member, an axis being defined along a portion of the flow path, the axis being substantially parallel to the direction of travel.

2. The vented transport cover of claim 1, wherein said venting member further comprises a flange section and wherein said flange section is secured to said cover by sewing.

3. The vented transport cover of claim 1, wherein said cover member further comprises a bottom portion configured to seat tightly around the exterior perimeter of the cargo.

4. The vented transport cover of claim 3, wherein said bottom portion comprises a peripheral seam and drawstrings inserted therethrough, with drawstrings ends accessible to draw said bottom portion of said cover tightly around the exterior perimeter of the cargo.

5. The vented transport cover of claim 1, wherein said cover member is constructed of a flexible, air impermeable material.

6. The vented transport cover of claim 5, wherein said cover member is constructed of a polyester material coated with polyurethane.

7. The vented transport cover of claim 1, wherein said venting member is constructed of a synthetic resin.

8. The vented transport cover of claim 1, wherein said cover member has a longitudinal axis and wherein the axis defined along the portion of the flow path through the venting member is a longitudinal axis substantially parallel to the longitudinal axis of the cover member.

9. The vented transport cover of claim 1, further comprising a second opening formed within said surface of said cover and a second venting member secured to said cover member within said second opening, said second venting member including:
- a further exhaust aperture extending inwardly relative to said surface of said cover member and oriented towards said front portion of said cover member; and
- a further air diffusing member extending outwardly relative to said surface of said cover member.

10. A vented transport cover configured to fit over an object subjected to an airstream, said vented transport cover comprising:
- a cover member having an opening formed therein;
- a venting member disposed within said opening having a base portion connected to an exterior surface of said cover, said venting member also having an exhaust aperture extending inwardly relative to said base portion, wherein said exhaust aperture is recessed below said exterior surface of said cover.

11. The vented transport cover of claim 10, wherein said base portion is a flange secured around said opening to the exterior surface of said cover member.

12. The vented transport cover of claim 11, wherein said flange is sewn to said cover around said opening in said cover.

13. The vented transport cover of claim 10, wherein said venting member further comprises an air diffusing member extending outwardly relative to said base portion, said air diffusing member configured to disrupt the airstream during transport.

14. The vented transport cover of claim 13, wherein said outwardly extending air diffusing member is oriented in close proximity to said inwardly extending exhaust aperture within said venting member.

15. The vented transport cover of claim 13, wherein said air diffusing member is substantially the same width as said exhaust aperture.

16. The vented transport cover of claim 10, further comprising a second venting member disposed within a second opening in said cover member.

17. A cover for protecting an object during transport in an airstream, said cover comprising:
- a unitary, flexible cover member having a surface and having at least one opening formed therein;
- a venting member secured within said opening in said cover, said venting member having a front end oriented in the direction of transport and a rear end oriented in the direction opposite of transport, said venting member comprising:
  - a body portion including an exhaust aperture recessed below said surface of said cover and located substantially at said front end of said venting member, said body portion ramping upwards from said front end of said venting member to said rear end of said venting member to said surface of said cover; and
  - an air diffusing member extending above said surface of said cover member and located substantially at said front end of said venting member.

18. The cover of claim 17, wherein said air diffusing member is an outwardly extending flange having a front surface and a rear surface, whereby said front surface of said flange is configured to disrupt the airstream.

19. A vented transport cover for protecting cargo subjected to an oncoming airstream during transport, said transport cover comprising:
- a cover member having an opening formed therein; and
- a venting member secured at said opening to an exterior surface of said cover, the venting member including an exhaust aperture recessed below said exterior surface of said cover at a front end of the venting member.

20. The vented transport cover of claim 19, further comprising a sloping portion ramping upwards from said recessed exhaust aperture to said exterior surface of said cover at a rear end of the venting member.

21. The vented transport cover of claim 20, wherein said sloping portion is flush with said exterior surface of said cover at said rear end of said venting member.

22. The vented transport cover of claim 19, further comprising an air diffusing section extending outward relative to said exterior surface of said cover, said air diffusing section configured to disrupt the oncoming airstream.

23. The vented transport cover of claim 22, wherein said outwardly extending air diffusing section is oriented in close proximity to said recessed exhaust aperture within said venting member.

24. A venting system for use in a protective cover for cargo traveling in an airstream, said venting system comprising:
- a base portion having a first surface and a second surface, and having a front end and a rear end;
- a body portion extending downwardly from said second surface of said base portion, said body portion including an exhaust aperture extending inwardly relative to said base portion and oriented at substantially said front end of said base portion; and
- an air diffusing member extending upwardly from said first surface of said base portion, said air diffusing member oriented at substantially said front end of said base portion in close proximity to said exhaust aperture;
- a flow path being defined through the venting system, an axis being defined along a portion of the flow path, the axis being substantially parallel to a direction of travel in the airstream.

25. The venting system of claim 24, wherein the base portion is connectable to the protective cover.

26. A venting system for use in a protective cover for cargo traveling in an airstream, said venting system comprising:
- a base portion having a first surface and a second surface and having a front end and a real end;
- a body portion extending downwardly from said second surface of said base portion, said body portion including an exhaust aperture extending inwardly relative to said base portion and oriented at substantially said front end of said base portion; and
- an air diffusing member extending upwardly from said first surface of said base portion, said air diffusing member oriented at substantially said front end of said base portion in close proximity to said exhaust aperture;

wherein the air diffusing member includes a concave front surface.

27. A venting system for use in a protective cover for cargo traveling in an airstream, said venting system comprising:

a base portion having a first surface and a second surface, and having a front end and a rear end;

a body portion extending downwardly from said second surface of said base portion, said body portion including an exhaust aperture extending inwardly relative to said base portion and oriented at substantially said front end of said base portion; and an air diffusing member extending upwardly from said first surface of said base portion, said air diffusing member oriented at substantially said front end of said base portion in close proximity to said exhaust aperture;

wherein the air diffusing member includes two lateral side edges which are detached from the base portion.

* * * * *